(12) United States Patent
Sivathanu et al.

(10) Patent No.: US 8,134,703 B2
(45) Date of Patent: Mar. 13, 2012

(54) APPARATUS FOR THE QUALITY CONTROL OF NOZZLES

(75) Inventors: Yudaya R. Sivathanu, West Lafayette, IN (US); Jongmook Lim, West Lafayette, IN (US)

(73) Assignee: En'Urga Inc., West Lafayette, IN (US)

( * ) Notice: Subject to any disclaimer, the term of this patent is extended or adjusted under 35 U.S.C. 154(b) by 188 days.

(21) Appl. No.: 12/717,210

(22) Filed: Mar. 4, 2010

(65) Prior Publication Data

US 2010/0225912 A1    Sep. 9, 2010

Related U.S. Application Data

(60) Provisional application No. 61/157,575, filed on Mar. 5, 2009.

(51) Int. Cl.
*G01N 15/02* (2006.01)
(52) U.S. Cl. ...................................................... 356/335
(58) Field of Classification Search ............ 356/335–342
See application file for complete search history.

(56) References Cited

U.S. PATENT DOCUMENTS

| 5,701,156 | A  | * | 12/1997 | Pierce .............................. 348/86 |
| 6,184,989 | B1 | * | 2/2001 | Sivathanu et al. ............. 356/437 |
| 7,463,751 | B2 | * | 12/2008 | Farina ............................ 382/100 |
| 2009/0136086 | A1 | * | 5/2009 | Farina ............................ 382/100 |

* cited by examiner

*Primary Examiner* — Michael P Stafira
(74) *Attorney, Agent, or Firm* — Barnes & Thornburg LLP

(57) ABSTRACT

An apparatus and method for measuring spray angle, spray uniformity, and spray velocity using laser sheet tomography includes measuring the extinction image formed by a spray in two laser sheets spaced apart by a know distance.

20 Claims, 10 Drawing Sheets

APPARATUS FOR THE QUALITY CONTROL OF NOZZLES

RELATED APPLICATIONS

This application claims priority under 35 U.S.C. §119(e) to U.S. Provisional Application Ser. No. 61/157,575, filed Mar. 5, 2009, which is expressly incorporated by reference herein.

BACKGROUND

The present disclosure is related to an apparatus for the measurement of performance characteristics of a nozzle for spraying fluids. More specifically, the present disclosure is related to an apparatus and method for measuring spray angle, spray uniformity, and spray velocity using laser sheet tomography.

Measurement of spray angles and spray uniformity are important in numerous applications in a wide variety of industries. The automotive industry is concerned with fuel pattern uniformity and spray angles from fuel injectors to control combustion in internal combustion engines. The coating industry is interested in nozzle characterization to assure proper coating thickness and uniformity of appearance. In painting applications, the spray inclination and angle determines transfer efficiency. In pharmaceutical applications, spray inclination affects the particle deposition in airways. In agricultural sprayers, spray angle and boom height are critical to providing uniform spray coverage.

Spray angles have been measured mechanically with collection cups or with special paper, but such approaches are subject to operator interpretation. It has been shown that operator interpretation may vary by as much 20% with the same operator. Optical methods have been developed using scattered light from a laser or backlit imaging. In addition, laser induced fluorescence and holography have been used. Such approaches are limited to measuring surface area density of drops of spray material or mass concentrations. Dense sprays limit the usefulness of the optical approaches and dynamic flux information is not available. This is due to the scattering of light when the backlit approach is used.

U.S. Pat. No. 6,184,989 discloses an apparatus and control system for obtaining flow field statistics in non-steady and steady state flows using laser sheet tomography. A collimated laser sheet is formed by a laser illuminator and a flow field is passed through the sheet. An imaging system either detects the light scattered from the laser sheet by the flow field when the imaging system is positioned orthogonally to the laser illuminator, or the laser illuminator is directed to the imaging system with the imaging system detecting the extinction image to determine the flow field characteristics.

SUMMARY

The present application discloses one or more of the features recited in the appended claims and/or the following features which, alone or in any combination, may comprise patentable subject matter:

According to one aspect of the present disclosure, an apparatus for characterizing a spray pattern comprises a laser illuminator generating first and second collimated sheets, each sheet including a plurality of parallel rays of light directed in a first direction, the first collimated sheet spaced apart from a spray source generating a flow field by a first distance designated as X, and the second collimated sheet spaced apart from the source of spray by a second distance designated as Y, with Y being greater than X. The apparatus also comprises a first laser receiver including stops for restricting scattered portions of the parallel rays of light and first and second linear array cameras for receiving the parallel rays of light from the first and second collimated sheets. The apparatus also comprises an imaging controller for synchronizing the laser illuminator with the linear array cameras to synchronize the laser illuminator with the linear array cameras to control for extraneous radiation received by the first and second linear array cameras, and a computer electrically coupled to the imaging controller to receive data representative of the signals received by the first and second linear array cameras. The computer includes a processor and a memory device, the memory device including instructions that, when processed by the processor, cause the processor to process the data representative of the signals received by the linear array cameras to determine at least one characteristic of a flow field passing through the first and second collimated sheets by comparing the extinction image formed in the first collimated sheet with the extinction image formed in the second collimated sheet.

The characteristic of the flow field may be a spray angle of the flow field. The spray angle of the flow field may be determined by comparing the diameter of the flow field in the first collimated sheet to the diameter of the flow field in the second collimated sheet and performing a trigonometric calculation to determine the spray angle of the flow field. The trigonometric calculation may include summing the arctangent of the distance X divided by the diameter of the extinction image from the first collimated sheet with the arctangent of the distance Y divided by the diameter of the extinction image from the second collimated sheet and dividing the sum by two.

The characteristic of the flow field may be a spray velocity of the flow field. The spray velocity may be determined by correlating the instantaneous time series of the extinction images formed in each of the first and second collimated sheets as a function of radial distance from a centerline axis of the flow field and time to determine the maximum correlation value. The time difference at the maximum correlation value for a particular radial location is used to determine a velocity of the spray at the radial location.

The characteristic of the flow field may be the spray uniformity of the flow field. The spray uniformity may be determined by completing optical patternation of the extinction images at each of the first and second collimated sheets and comparing the extinction images.

According to another aspect of the present disclosure, a method of characterizing the spray from a spray device comprises generating a first laser sheet spaced apart from the spray device by a first distance, the first laser sheet including a plurality of parallel rays of light and generating a second laser sheet spaced apart from the spray device by a second distance, the second laser sheet including a plurality of parallel rays of light. The method also includes detecting the absorption of the first and second laser sheets by measuring a first extinction image from the first laser sheet and a second extinction image from the second laser sheet as the spray passes through the sheets, and determining a flow characteristic of the spray device by comparing the first extinction image with the second extinction image.

The method may further comprise controlling the detection of the first and second laser sheets to correct for extraneous radiation. Controlling the detection of the first and second laser sheets to correct for extraneous radiation may include filtering the first and second sheets through apertures to restrict widely scattered laser signals. Controlling the detection of the first and second laser sheets to correct for extraneous radiation may include synchronizing the generation of the laser sheets with the detection of the extinction images to eliminate secondary or inherent radiation emitted from the laser signals of the laser sheets.

Determining a flow characteristic of the spray device by comparing the first extinction image with the second extinction image may include determining the uniformity of the spray by completing optical patternation.

Determining a flow characteristic of the spray device by comparing the first extinction image with the second extinction image may include determining the spray angle. The spray angle may be determined by evaluating the first extinction image to determine a first diameter of the spray at the first laser sheet, evaluating the second extinction image to determine a second diameter of the spray at the second laser sheet, and calculating the spray angle by summing the arctangent of the first distance divided by the first diameter with the arctangent of the second distance divided by the second diameter and dividing the sum by two.

Determining a flow characteristic of the spray device by comparing the first extinction image with the second extinction image may include determining a spray velocity. The spray velocity may be determined by correlating the instantaneous time series of absorption of each of the first and second laser sheets as a function of a radial distance in the spray over a number of time intervals, to each other instantaneous time series of absorption at the radial distance in the spray, identifying the time difference between the maximum correlation at the radial distance in the spray, and calculating the velocity of the spray using the time difference identified. The correlation may be calculated in accordance with:

$$\rho(r, \nabla t) = \frac{\sum \Gamma(X, r, t) \cdot \Gamma(Y, r + \Delta r, t + \Delta t)}{\sqrt{\sum \Gamma^2(X, r, t)} \cdot \sqrt{\sum \Gamma^2(Y, r + \Delta r, t + \Delta t)}}$$

where X is the first distance, Y is the second distance, r is the radial location, and t is time.

The velocity at a radial location may be computed in accordance with $$V(r) = \frac{\sqrt{(X, r)^2 - (Y, r + \Delta r)^2}}{\nabla t_{max}}$$

where X is the first distance, Y is the second distance, r is the radial location, t is time, and $\nabla t_{max}$ is the time difference at the maximum correlation between X and Y at r.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 4:
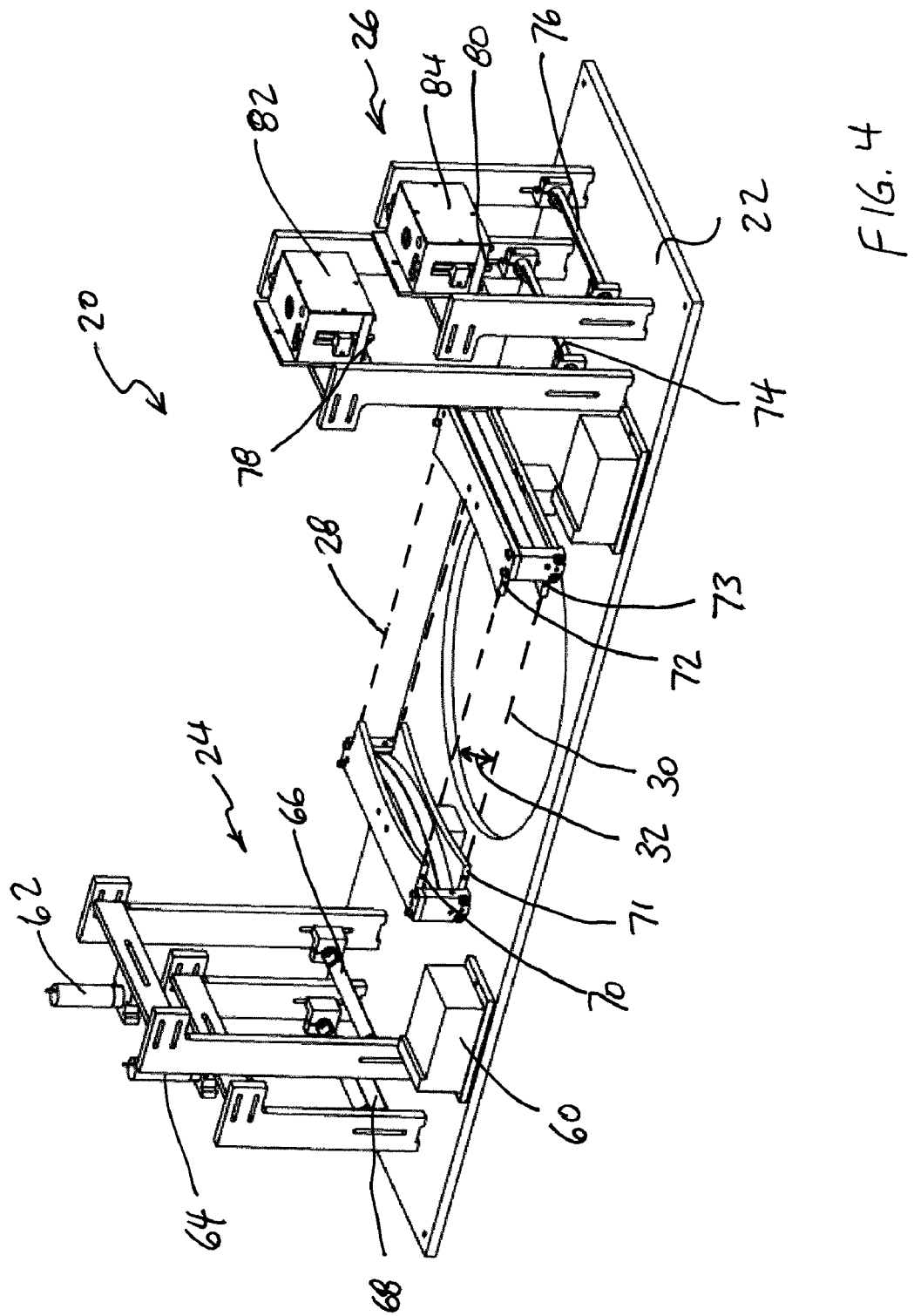
FIG. 4 is a perspective view of an angle patternator for measuring characteristics of a spray from a nozzle.

An apparatus for measuring characteristics of a spray 34 is illustratively embodied as an angle patternator 20, shown in FIG. 4. The patternator 20 includes a frame 22 supporting a laser illuminator 24 and a laser receiver 26. The laser illuminator 24 forms two sheets 28, 30 of collimated laser signals which are spaced apart by a distance 32. The laser receiver 26 receives the collimated laser signals from the two sheets 28, 30 and processes information related to the laser signals to determine the topography of a spray (seen in FIG. 5) that passes through the sheets 28, 30. By comparing the topography of the spray 34 at each sheet, characteristics of the spray 34 can be derived. For example, the spray angle, spray uniformity, and spray velocity can each be determined from the analysis of the topography.

Figure 1:
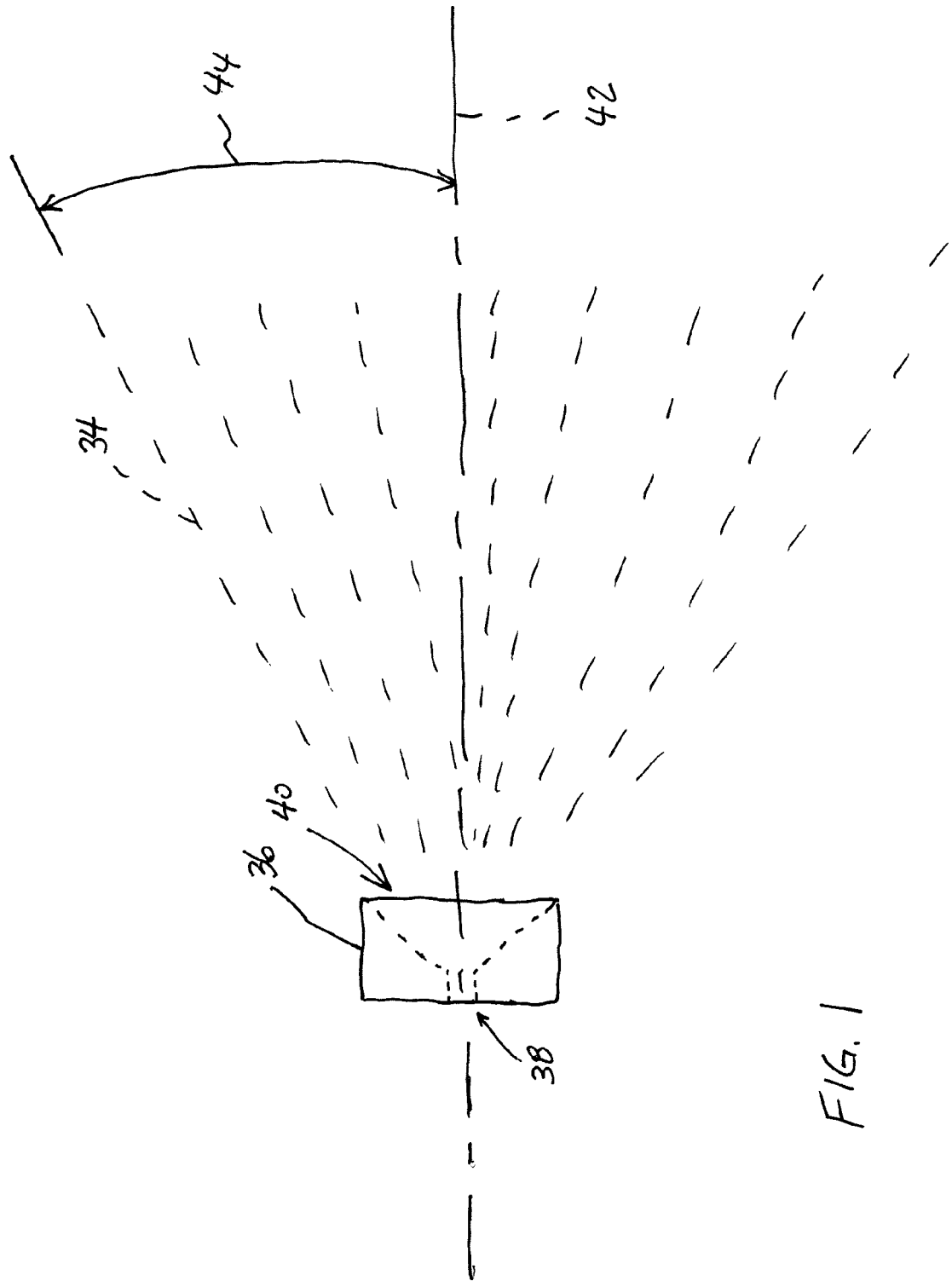
FIG. 1 is a diagrammatic representation of the divergence of spray from a nozzle in a single plane viewed along a line perpendicular to the plane.
Figure 2:
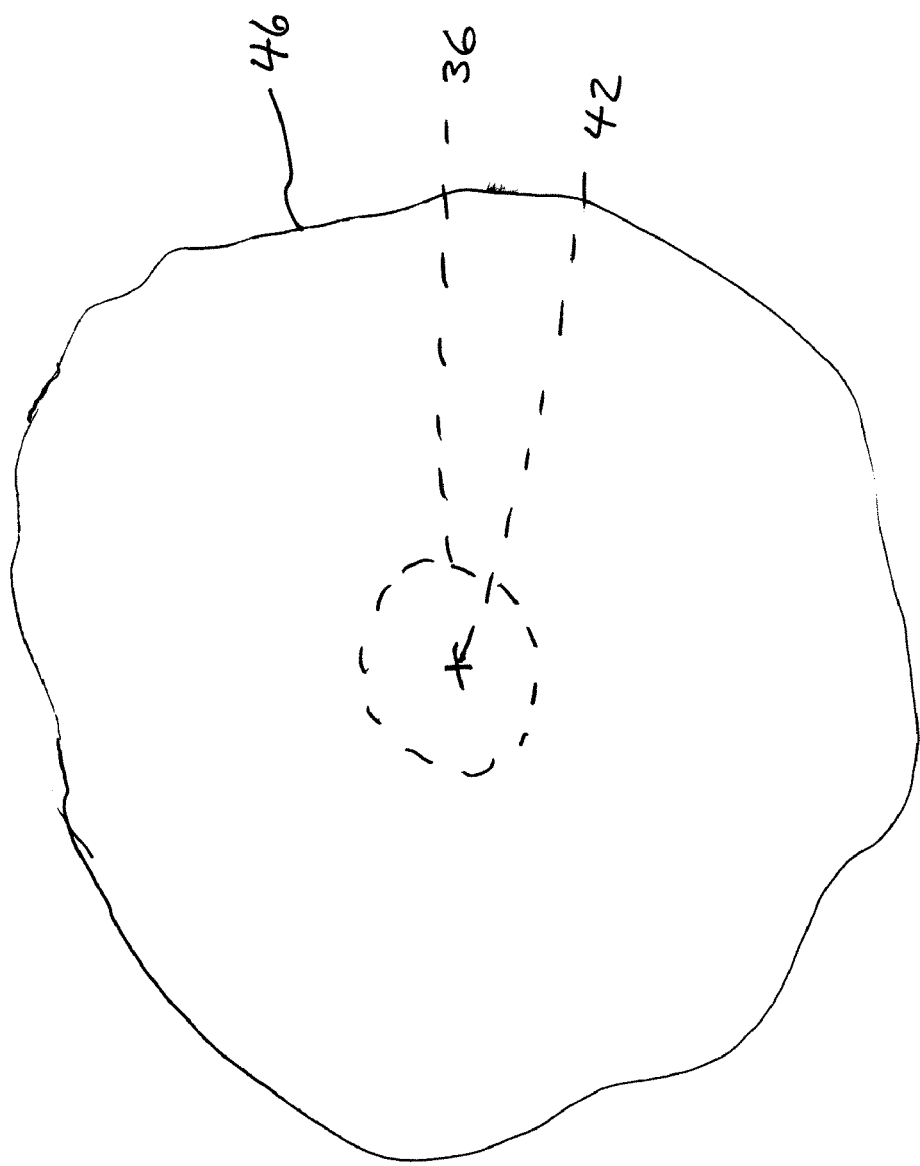
FIG. 2 is a diagrammatic representation of the shape of an illustrative spray from a nozzle viewed along the axis of the nozzle.

Referring now to FIG. 1, a nozzle 36 includes an inlet 38 and an outlet 40, each shown in phantom in FIG. 1. In the illustrative example, the nozzle 36 includes an axis 42 which is centered on the common center line between inlet 38 and outlet 40. In an idealized model of a circular nozzle, the spray 34 from the nozzle 36 is uniform about the axis 42. The idealized spray angle 44 is uniform about the axis 42 such that the spray 34 forms a frustoconical shape as it travels away from the nozzle 36. In real world applications, the spray 34 does not act in an ideal manner and various performance factors impact the consistency of the spray 34 as the spray 34 diverges from the nozzle 36. For example, FIG. 2 shows an illustrative example of an irregular spray profile 46 that is formed when the spray 34 contacts a surface spaced apart from the nozzle 36. Because of variations in the performance of the nozzle 36, the spray profile 46 may have different shapes at different distances away from the nozzle 36.

Figure 3:
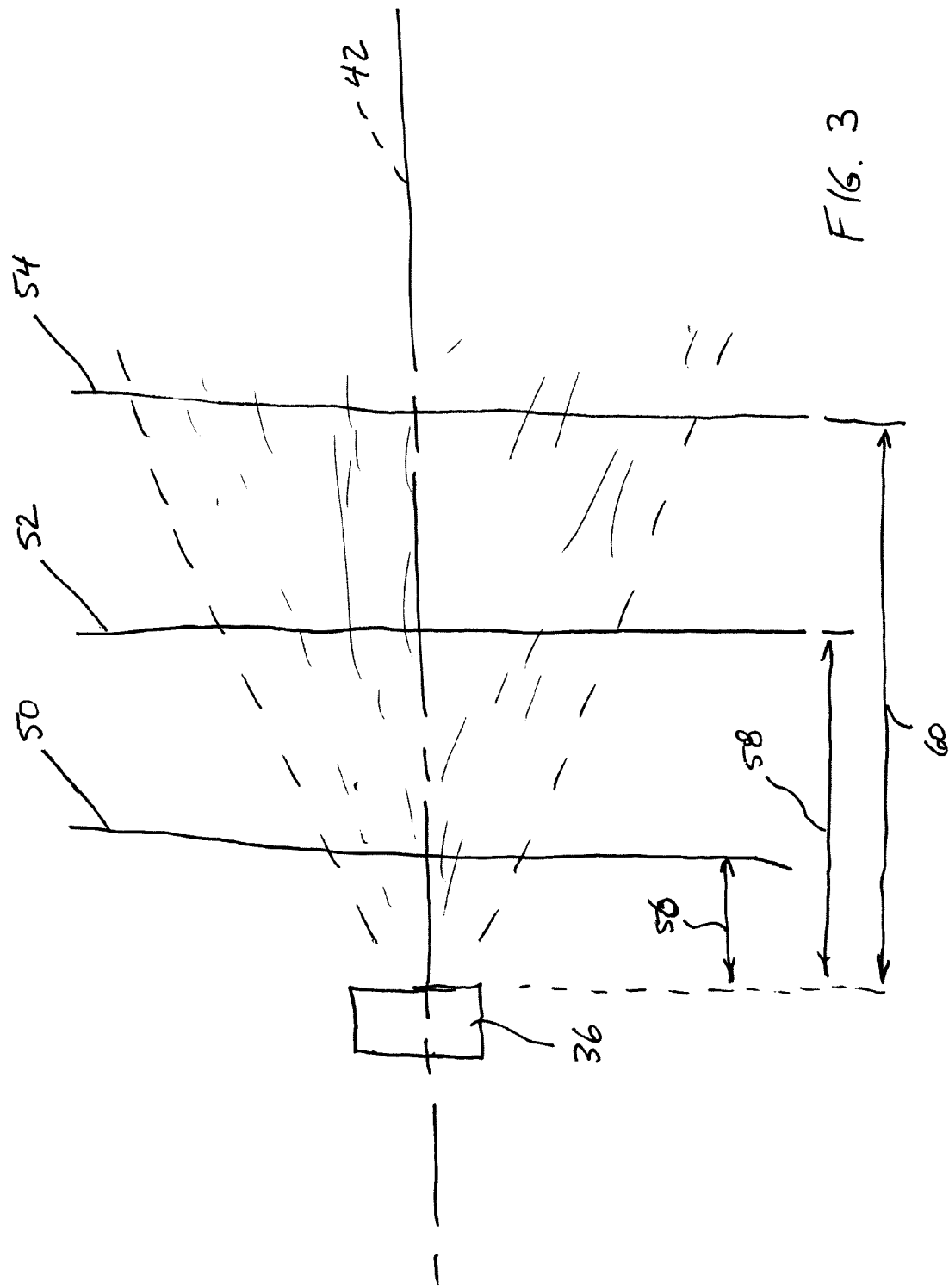
FIG. 3 is a diagrammatic representation similar to FIG. 1, with the divergent spray intersecting a number of planes in a single axis.
Figure 5:
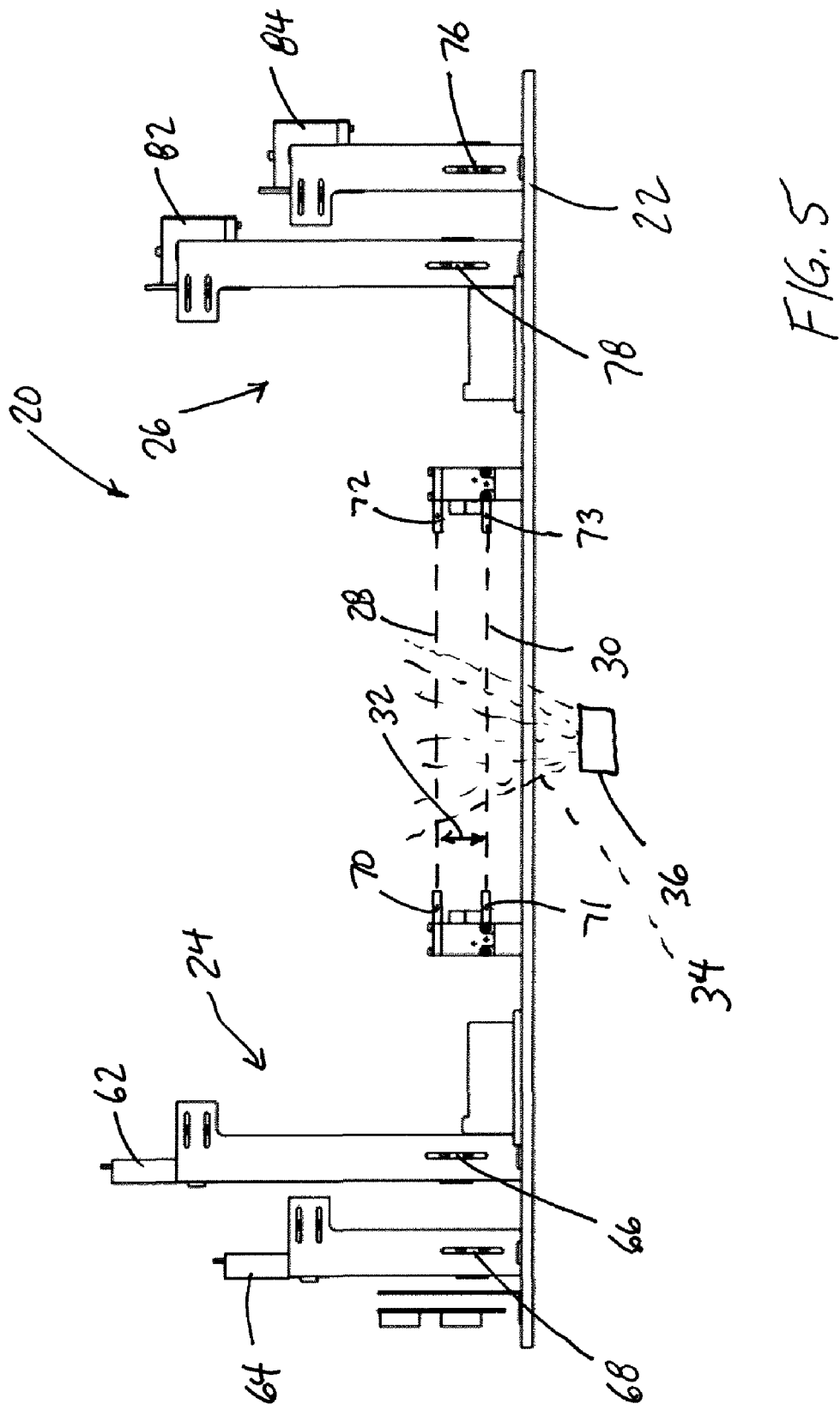
FIG. 5 is a side view of the angle patternator of FIG. 4.

Imaginary planes 50, 52, 54 shown in FIG. 3, spaced apart from the nozzle 36 by the distances 56, 58, 60 respectively, will each produce a different spray profile. By utilizing an angle patternator 20 as shown in FIG. 4, extinction images can be determined for the spray 34 at known locations such as sheets 28, 30, for example. The extinction images generated by each sheet 28, 30 are representative of the absorption of the laser signals of each sheet 28 or 30 by the spray 34. As shown in FIG. 5, the laser receiver 26 receives the laser signals generated by laser illuminator 24 that travel in a line perpendicular to the axis 42 of the nozzle 36. The spray 34 passes as a flux through the sheets 28, 30, disrupting the laser signal from the laser illuminator 24. The laser receiver 26 receives the disrupted laser signals over time. The data from the laser signal is processed by the patternator 20 to determine the topography in the view profile.

In the illustrative embodiment of FIGS. 4 and 5, the angle patternator 20 includes a power supply 60 powering two lasers 62, 64 of the laser illuminator 24. The laser illuminator also includes two mirrors 66, 68 which direct the beams of the lasers 62, 64 to two collimating lenses 70, 71 which convert the beams of the lasers 62, 64 into the sheets 28, 30. The laser receiver 26 includes two focusing lenses 72, 73 which receive the laser signals from the sheets 28, 30 and direct the laser signals to respective mirrors 74, 76 which direct the signals from each of the sheets 28, 30 to respective imaging lenses 78, 80 of two linear array cameras 82, 84. The linear array cameras 82, 84 process the signals from the respective sheets 28, 30 to digitize the signals. As will be described below, the signals are collected over time to provide data regarding the flux of the signals, and thereby, the flux of the spray. Another suitable configuration of an apparatus for generating a laser sheet, such as a laser sheet 78 or 80, for example, is disclosed in U.S. Pat. No. 6,184,989, which is incorporated herein by reference. For example, a single laser may be used with a beam splitter to form the two sheets 28, 30.

The illustrative angle patternator 20 produces laser signals that are beams having a diameter that is less than the size of a pixel of the linear array cameras 82, 84 so that contamination of the laser signals due to interaction between adjacent parallel beams does not impact adjacent pixels. In addition, the focusing lenses 72, 73 include apertures which restrict widely scattered laser signals to reduce scattering effects in the signals received by the linear array cameras 82, 84. By physically controlling the beam size and path, any stray light effects may be minimized, thereby improving the quality of the extinction images detected.

Figure 6:
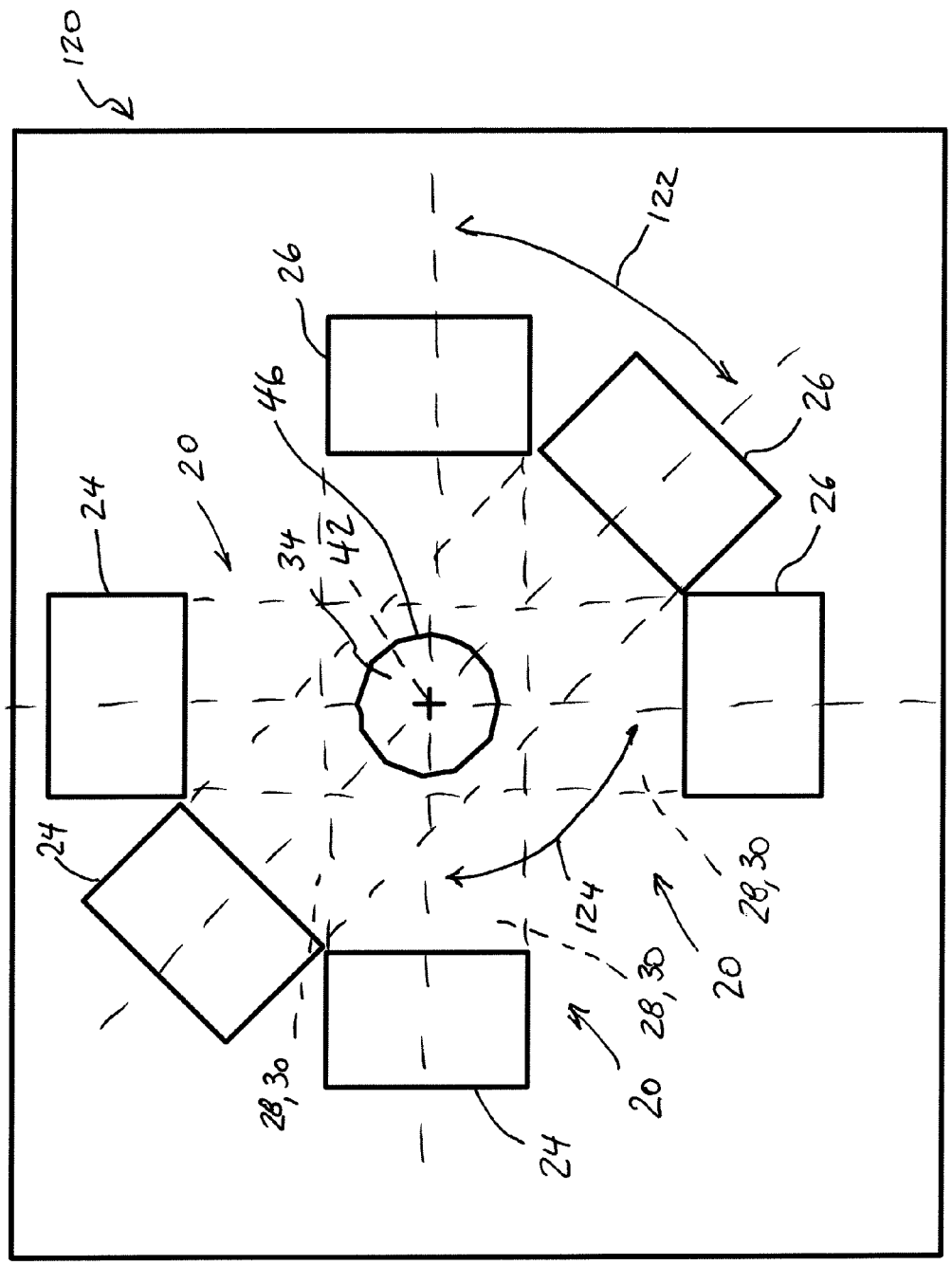
FIG. 6 is a block diagram of a multi-axis angle patternator.

Referring now to FIG. 6, a diagrammatic representation of a multi-axis patternator 120 is shown. By detecting extinction images from multiple perspectives perpendicular to the spray axis 42, each of the extinction images from each perspective in the same plane may be correlated to better characterize the spray 34. Illustratively, the multi-axis patternator 120 has three patternators 20 positioned at known angles 122, 124 relative to each other. With each patternator 20 positioned such that the two laser sheets 28, 30 for each single axis patternator 20 are substantially vertically aligned, the extinction images may be synchronized in time to determine real-time flow characteristics with improved accuracy across the entire flow field of the spray 34. It should be understood that additional patternators 20 positioned at known angles will also improve the accuracy of the flow characteristics determined from the extinction images. It is contemplated that a multiple-axis patternator may include as many as ten axes. Illustratively, a six-axis patternator, model SETscan OP600, is available from En'Urga, Inc. of West Lafayette, Ind.

Figure 7:
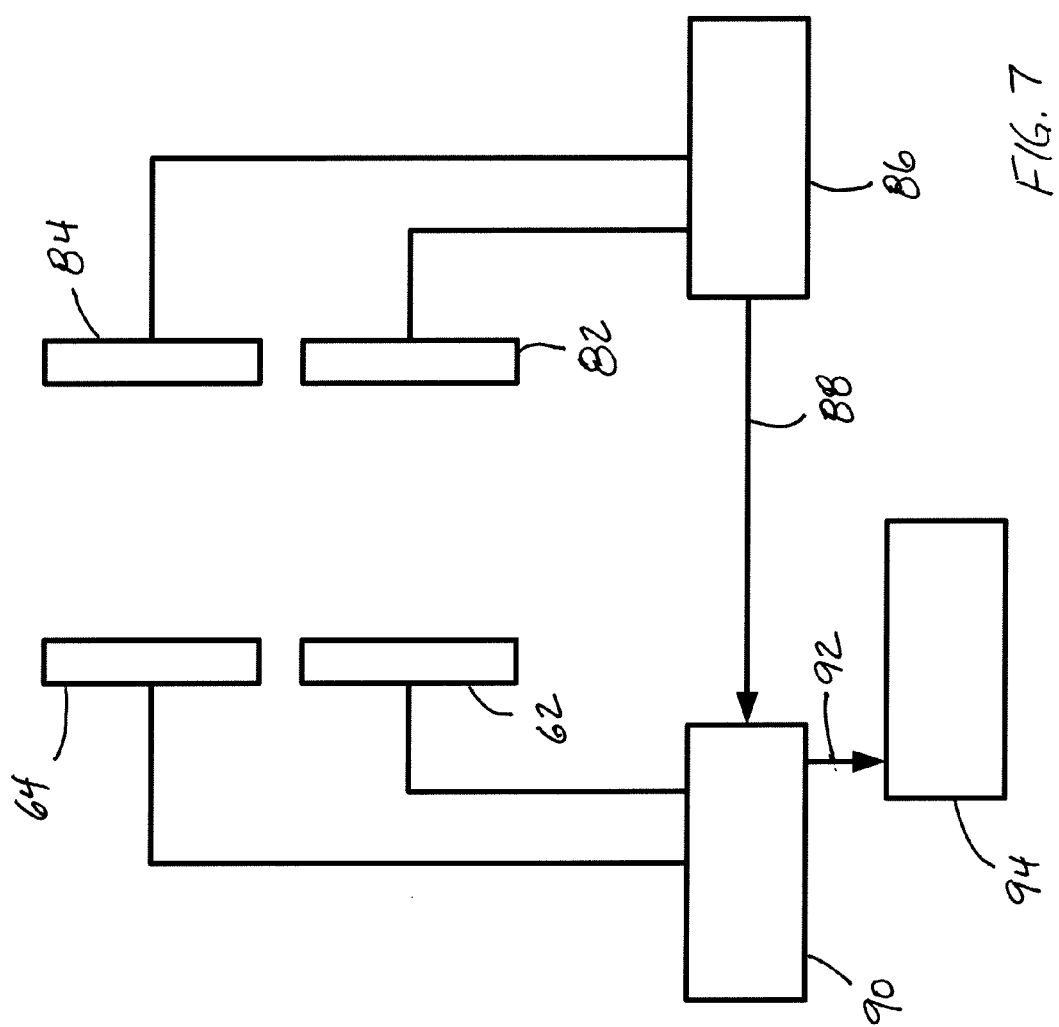
FIG. 7 is a schematic diagram of a single axis patternator.

The operation of the patternator 20 is managed by the controller 90 shown in the block diagram of FIG. 7. The controller 90 is operable to synchronize the operation of the lasers 62, 64 with the collection of data from the linear array cameras 82, 84. This synchronization provides digital and analog lock-in-amplification of the signal to reduce the potential for secondary or inherent radiation from impacting the data collection. The controller 90 is coupled to a drive circuit 86 which biases and multiplexes the signal from the linear array cameras 82, 84 and provides a multiplexed voltage to the controller 90 through a connection 88. The controller 90 includes an A/D converter that converts the multiplexed voltage from the drive circuit 86 and converts the voltage to a digital signal used by a processor in the controller 90 to determine a transmittance at each pixel in the linear array cameras 82, 84. A suitable methodology for determining the transmittance is disclosed in U.S. Pat. No. 6,184,989. The controller 90 synchronizes the data collection with the drive signal provided to the respective lasers 62, 64 as discussed above. The controller 90 also includes a universal serial bus (USB) controller which transfers the data received from the linear array cameras 82, 84 through a high speed USB connection 92, to a computer 94.

The data transferred to the computer 94 includes the location of the laser sheets 28, 30 along the axis 42 of the spray 34, a time stamp, and the pixel location along the linear array camera 82, 84. While the data at each linear array camera 82, 84 may be examined to determine certain flow field characteristics, a comparison of the data from a linear array camera 82, 84 with the other linear array camera 82, 84 over time allows certain flux characteristics of the flow field to be determined. For example, the spray angle 44, the spray velocity at a distance from the nozzle 36, and a measure of the spray uniformity may each be determined with the patternator 20. The data is stored in memory accessible by a processor of the computer 94. The computer 94 also includes software stored in memory and accessible by the processor. The processor utilizes the software stored in memory to perform calculations that characterize certain parameters of the flow of the spray 34.

Figure 8:
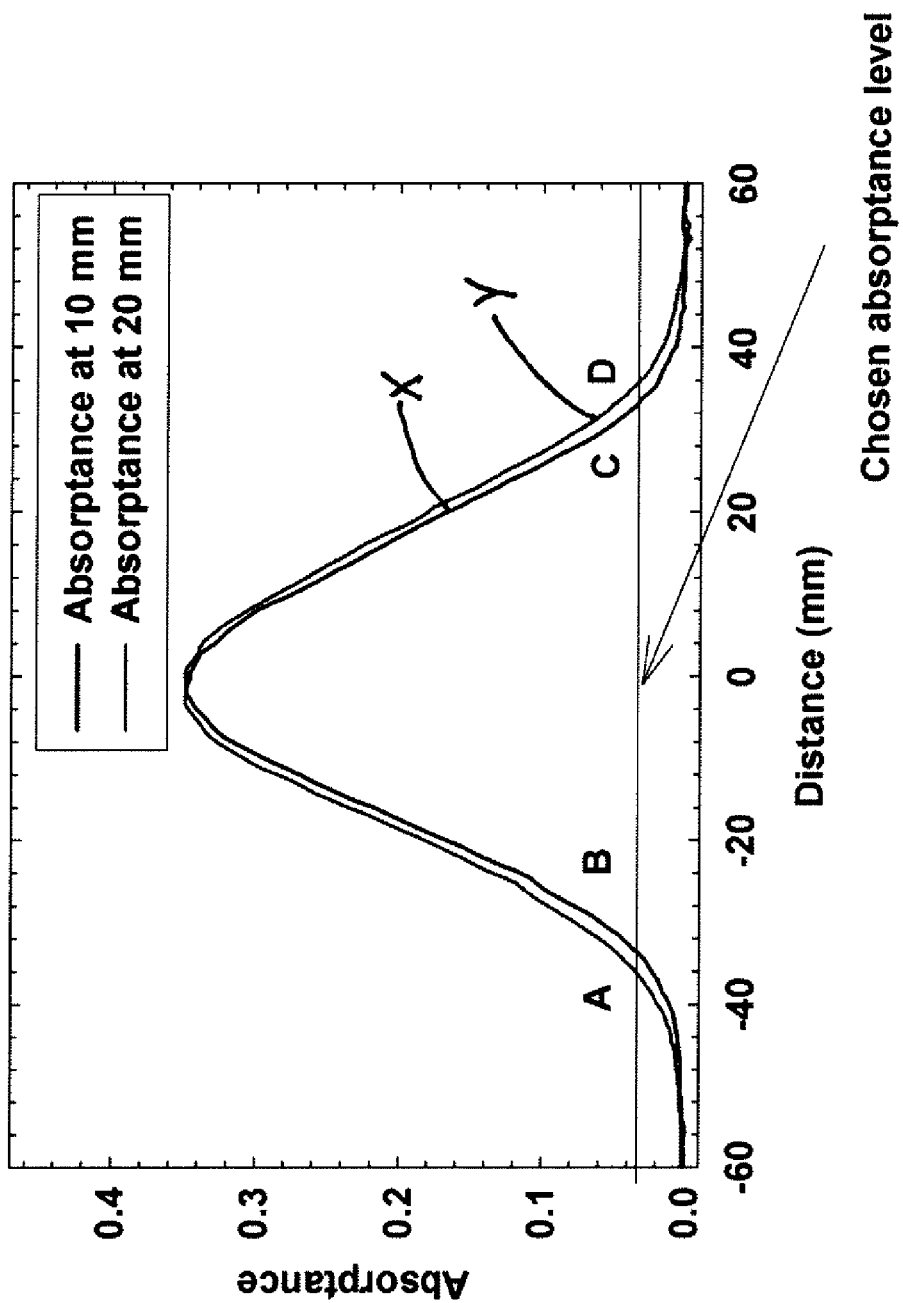
FIG. 8 is a graphical representation of the absorption of a spray detected at two axial locations

The absorptance profile of an illustrative spray at each of two axial locations is shown in FIG. 8. In the chart of FIG. 8, the absorptance determined from the extinction image at a position of 10 mm along an axis of the spray is designated as X. The absorptance at an axial location of 20 mm is designated as Y. Choosing an effective level of absorptance for the particular application, a line is drawn through the profiles to determine the radial values for each profile at the chosen absorptance level. In the illustrative example, points A and D represent the points on the X profile and points B and C represent the points on the Y profile. The diameter of the spray at X is the magnitude of AD and the diameter of the spray at Y is the magnitude of BC. The angle α of the spray can then be calculated according to:

$$\alpha = \frac{\left[\left(\arctan\left(\frac{X}{AD}\right) + \arctan\left(\frac{Y}{BC}\right)\right)\right]}{2} \quad (1)$$

It should be understood that such a calculation can be made from the data collected from the patternator 20 without the need to perform the calculation graphically. For example, once an acceptable level of absorption is determined for a particular application, the diameter of the spray at the locations X and Y, which correspond to the locations of the illustrative laser sheets 28, 30, the trigonometric calculation necessary could be calculated by the processor of the computer 94 using software stored in memory accessible to the processor.

To determine the spray velocity, the instantaneous time series of absorptance (Γ) at each laser sheet 28, 30 is used to calculate a correlation coefficient, ρ, as a function of the radial distance (r) in the spray and time gradient, ∇t. The time gradient may range from zero to a maximum sampling time. The time series is expressed as:

$$\rho(r, \nabla t) = \frac{\sum \Gamma(X, r, t) \cdot \Gamma(Y, r + \Delta r, t + \Delta t)}{\sqrt{\sum \Gamma^2(X, r, t)} \cdot \sqrt{\sum \Gamma^2(Y, r + \Delta r, t + \Delta t)}} \quad (2)$$

The time series results in an array of correlations at each radial location, r, and for each time gradient, ∇t. Choosing the maximum correlation value for each radial location establishes the $\nabla t_{max}$ which is the time gradient at which the extinction image at the particular radial location, r, at the axial location X, best correlates with the extinction image at the axial location Y. In the illustrative example of FIG. 3, the axial location X corresponds to plane 50 with a value of 56 and the axial location Y corresponds to plane 52 with a value of 58.

With $\nabla t_{max}$ from equation 2, the velocity of the spray at an axial location, r, may be calculated according to:

$$V(r) = \frac{\sqrt{(X,r)^2 - (Y, r+\Delta r)^2}}{\nabla t_{max}} \quad (3)$$

with Δr being chosen according to characteristics of the spray 34. For example, a relatively acute spray angle 44 may indicate a smaller Δr. Depending on the characteristics of the particular spray 34 under study, Δr, may be chosen to provide the optimum value. In some instances, Δr may be chosen to be zero.

Figure 9:
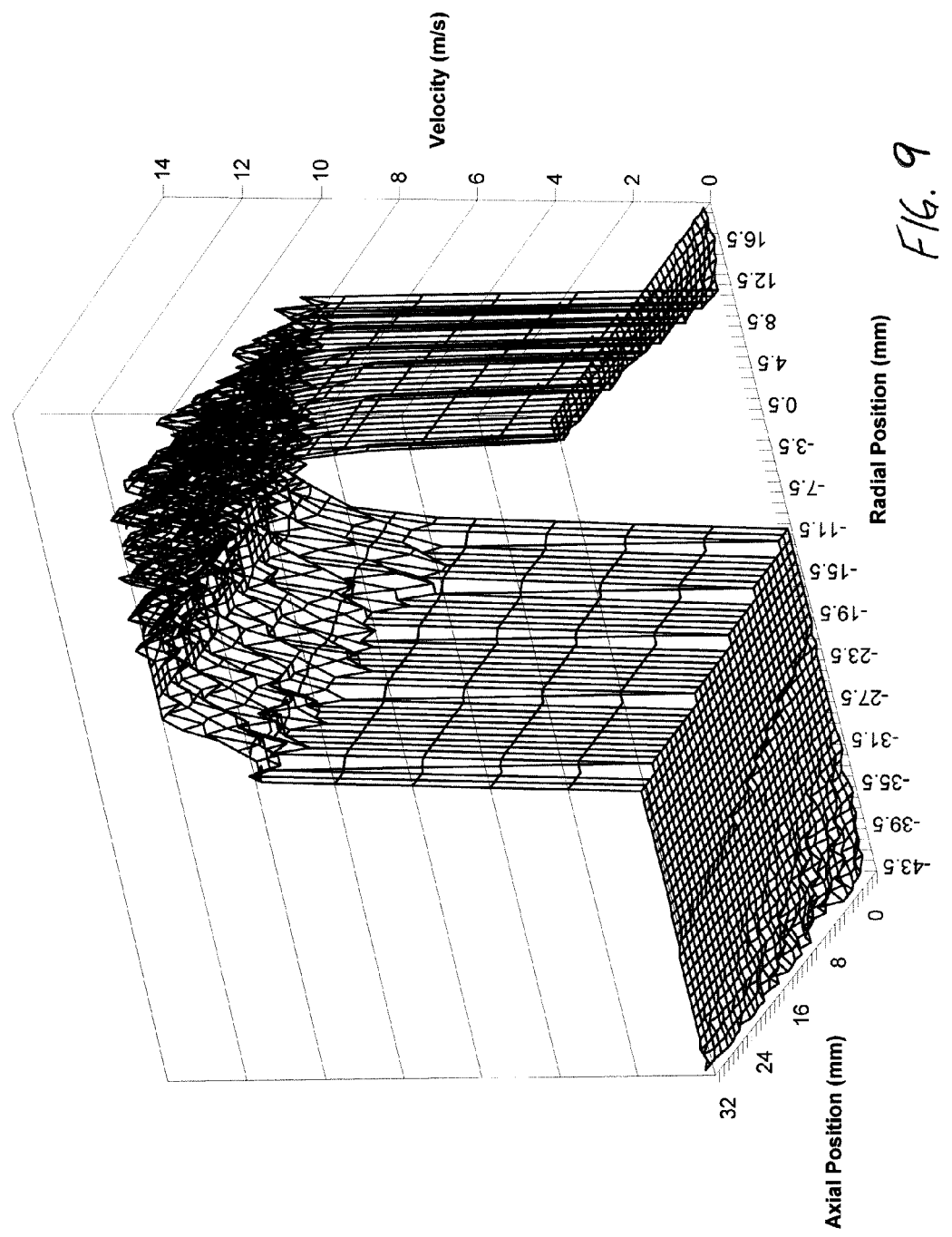
FIG. 9 is a graphical representation of the velocity of a spray from a nozzle taken at different distances from the outlet of the nozzle.
Figure 10:
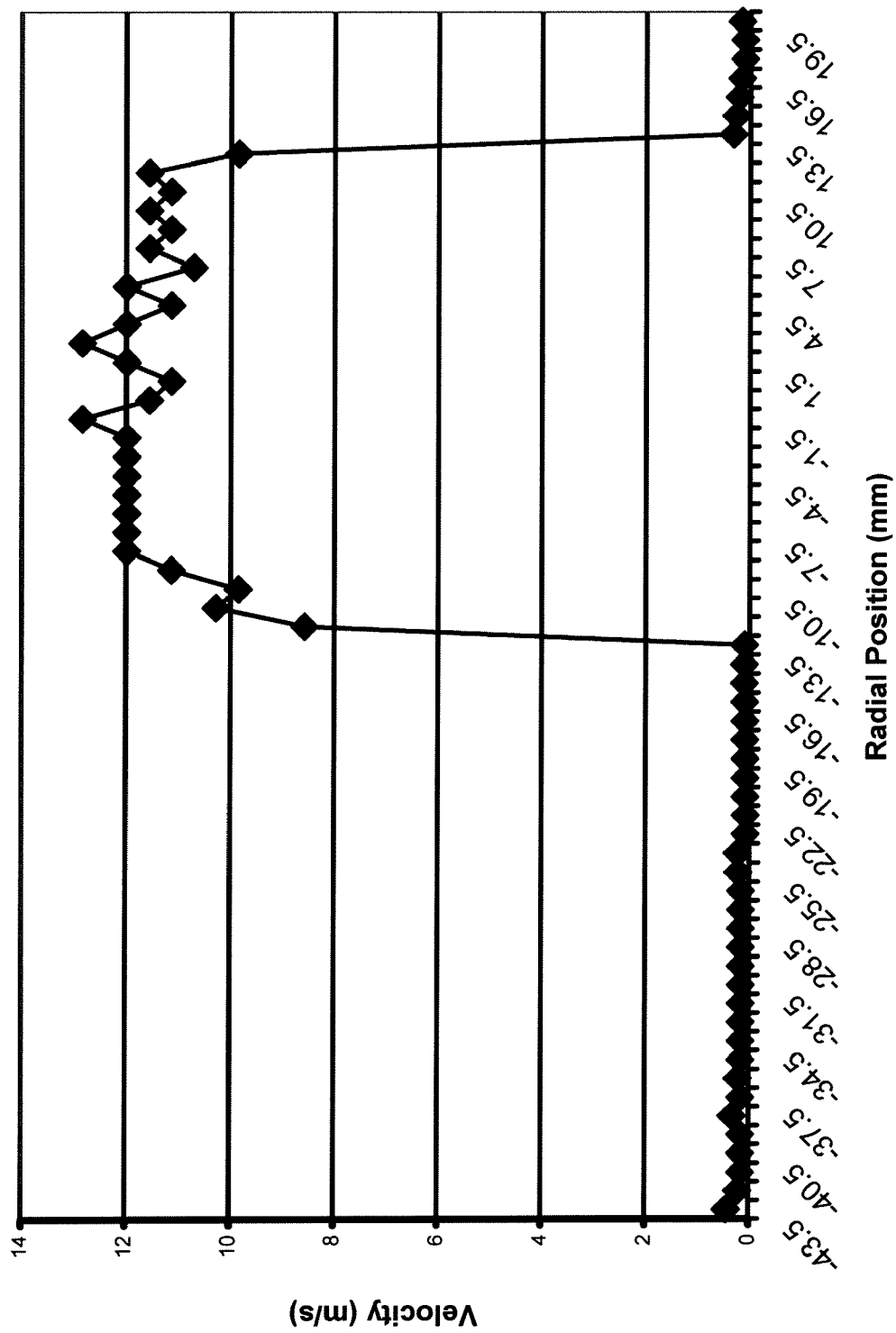
FIG. 10 is a graphical representation of the velocity of the spray of FIG. 8 at a single axial location.

Referring to FIG. 9, a three dimensional graph of the velocity of an illustrative spray is shown at multiple axial positions. FIG. 10 shows the data that corresponds to the axial location of 11 mm in the chart of FIG. 9. As can be seen in the chart from FIG. 10, the velocity of the spray is relatively consistent over a significant diameter with some increased variation over the radial locations greater than zero. This information may permit a user to draw inferences with regard to the performance of the nozzle which creates this spray. Similarly, the extinction image that is formed at each location along the spray axis 42 may be evaluated to determine the uniformity of the spray 34 over the axial interval. The optical patternation at each location may be compared by correlation, for example, to determine the uniformity of the spray 34 over the interval.

It should be understood by those of ordinary skill in the art that other suitable methods of calculating the velocity using the absorptance time series at spaced apart axial locations may be employed. For example, the Fourier Transform method may be obtained. The energy at the peak wave numbers may be calculated with the local velocities being calculated in a method similar to the technique used in laser doppler velocimetry.

Although certain illustrative embodiments have been described in detail above, variations and modifications exist within the scope and spirit of this disclosure as described and as defined in the following claims.

The invention claimed is:

1. An apparatus for characterizing a spray pattern, the apparatus comprising
   a laser illuminator generating first and second collimated sheets, each sheet including a plurality of parallel rays of light directed in a first direction, the first collimated sheet spaced apart from a spray source generating a flow field by a first distance designated as X, and the second collimated sheet spaced apart from the source of spray by a second distance designated as Y, with Y being greater than X,
   a laser receiver including stops for restricting scattered portions of the parallel rays of light and first and second linear array cameras for receiving the parallel rays of light from the first and second collimated sheets, respectively,
   an imaging controller for synchronizing the laser illuminator with the linear array cameras to synchronize the laser illuminator with the linear array cameras to control for extraneous radiation received by the first and second linear array cameras, and
   a computer electrically coupled to the imaging controller to receive data representative of the signals received by the first and second linear array cameras, the computer including a processor and a memory device, the memory device including instructions that, when processed by the processor, cause the processor to process the data representative of the signals received by the linear array cameras to determine at least one characteristic of a flow field passing through the first and second collimated sheets by comparing the extinction image formed in the first collimated sheet with the extinction image formed in the second collimated sheet.

2. The apparatus of claim 1, wherein the characteristic of the flow field is a spray angle of the flow field.

3. The apparatus of claim 2, wherein the spray angle of the flow field is determined by comparing the diameter of the flow field in the first collimated sheet to the diameter of the flow field in the second collimated sheet and performing a trigonometric calculation to determine the spray angle of the flow field.

4. The apparatus of claim 3, wherein the trigonometric calculation comprises summing the arctangent of the distance X divided by the diameter of the extinction image from the first collimated sheet with the arctangent of the distance Y divided by the diameter of the extinction image from the second collimated sheet and dividing the sum by two.

5. The apparatus of claim 1, wherein the characteristic of the flow field is a spray velocity of the flow field.

6. The apparatus of claim 5, wherein the spray velocity is determined by correlating the instantaneous time series of the extinction images formed in each of the first and second collimated sheets as a function of the radial distance from a centerline axis of the flow field and a time gradient to determine the maximum value and the time gradient at the maximum value to determine a velocity at a radial location.

7. The apparatus of claim 1, wherein the characteristic of the flow field is the spray uniformity of the flow field.

8. The apparatus of claim 7, wherein the spray uniformity is determined by completing optical patternation of the extinction images at each of the first and second collimated sheets and comparing the extinction images.

9. A method of characterizing the spray formed by a spray device, the method comprising
   generating a first laser sheet spaced apart from the spray device by a first distance, the first laser sheet including a plurality of parallel rays of light,
   generating a second laser sheet spaced apart from the spray device by a second distance, the second laser sheet including a plurality of parallel rays of light,
   detecting the absorption of the first and second laser sheets by measuring a first extinction image from the first laser sheet and a second extinction image from the second laser sheet as the spray passes through the sheets, and
   determining a flow characteristic of the spray device by comparing the first extinction image with the second extinction image.

10. The method of claim 9, wherein the method further comprises controlling the detection of the first and second laser sheets to correct for extraneous radiation.

11. The method of claim 10, wherein controlling the detection of the first and second laser sheets to correct for extraneous radiation includes filtering the first and second sheets through apertures to restrict widely scattered laser signals.

12. The method of claim 11, wherein controlling the detection of the first and second laser sheets to correct for extraneous radiation includes synchronizing the generation of the laser sheets with the detection of the extinction images to eliminate secondary or inherent radiation emitted from the laser signals of the laser sheets.

13. The method of claim 10, wherein controlling the detection of the first and second laser sheets to correct for extraneous radiation includes synchronizing the generation of the laser sheets with the detection of the extinction images to eliminate secondary or inherent radiation emitted from the laser signals of the laser sheets.

14. The method of claim 9, wherein determining a flow characteristic of the spray device by comparing the first extinction image with the second extinction image includes determining the uniformity of the spray by completing optical patternation.

15. The method of claim 9, wherein determining a flow characteristic of the spray device by comparing the first extinction image with the second extinction image includes determining the spray angle.

16. The method of claim 15, wherein the spray angle is determined by evaluating the first extinction image to determine a first diameter of the spray at the first laser sheet, evaluating the second extinction image to determine a second diameter of the spray at the second laser sheet, and calculating the spray angle by summing the arctangent of the first distance divided by the first diameter with the arctangent of the second distance divided by the second diameter and dividing the sum by two.

17. The method of claim 9, wherein determining a flow characteristic of the spray device by comparing the first extinction image with the second extinction image includes determining a spray velocity.

18. The method of claim 17, wherein the spray velocity is determined by correlating the instantaneous time series of absorption of each of the first and second laser sheets as a function of a radial distance in the spray over a number of time intervals, to each other instantaneous time series of absorption at the radial distance in the spray, identifying the time difference between the maximum correlation at the radial distance in the spray, and calculating the velocity of the spray using the time difference identified.

19. The method of claim 18, wherein the correlation is calculated in accordance with:

$$\rho(r, \nabla t) = \frac{\sum \Gamma(X, r, t) \cdot \Gamma(Y, r + \Delta r, t + \Delta t)}{\sqrt{\sum \Gamma^2(X, r, t)} \cdot \sqrt{\sum \Gamma^2(Y, r + \Delta r, t + \Delta t)}}$$

where X is the first distance, Y is the second distance, r is the radial location, and t is time.

20. The method of claim 19, wherein the velocity at a radial location is computed in accordance with $$V(r) = \frac{\sqrt{(X, r)^2 - (Y, r + \Delta r)^2}}{\nabla t_{max}}$$

where X is the first distance, Y is the second distance, r is the radial location, t is time, and $\nabla t_{max}$ is the time difference at the maximum correlation between X and Y at r.

* * * * *